(12) United States Patent
Anderson et al.

(10) Patent No.: US 7,186,179 B1
(45) Date of Patent: Mar. 6, 2007

(54) ADJUSTABLE FLOW DEFLECTOR APPARATUS FOR TRANSITIONING CROP RESIDUE FLOW FROM AN AXIALLY ARRANGED THRESHING SYSTEM TO A RESIDUE DISTRIBUTION SYSTEM OF AN AGRICULTURAL COMBINE

(75) Inventors: Brian J. Anderson, Yorkville, IL (US); Luc Yde, Oost Vlaanderen (BE); Herbert M. Farley, Elizabethtown, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/204,230

(22) Filed: Aug. 15, 2005

(51) Int. Cl.
  *A01F 12/30* (2006.01)
(52) U.S. Cl. ..................................... 460/111
(58) Field of Classification Search ................ 460/101, 460/111, 112, 85; 56/505
  See application file for complete search history.

(56) References Cited

U.S. PATENT DOCUMENTS

| | | | |
|---|---|---|---|
| 1,959,465 A | 5/1934 | Dryfoos | 259/10 |
| 1,975,406 A | 10/1934 | Reschke | 83/11 |
| 3,943,939 A | 3/1976 | Rowland-Hill | 130/27 T |
| 4,018,232 A | 4/1977 | Rowland Hill et al. | 130/27 T |
| 4,056,107 A * | 11/1977 | Todd et al. | 460/112 |
| 4,175,568 A | 11/1979 | Nooyen | 130/27 T |
| RE31,257 E | 5/1983 | Glaser et al. | 130/27 L |
| 4,875,890 A | 10/1989 | Margerum et al. | 460/68 |
| 4,993,991 A | 2/1991 | Yarmashev et al. | 460/66 |
| 5,044,567 A | 9/1991 | Hausler et al. | 241/73 |
| 5,833,533 A * | 11/1998 | Roberg | 460/112 |
| 6,152,820 A | 11/2000 | Heidjann et al. | 460/112 |
| 6,241,605 B1 | 6/2001 | Pfeiffer et al. | 460/69 |
| 6,352,474 B1 | 3/2002 | Payne et al. | 460/66 |
| 6,547,169 B1 * | 4/2003 | Matousek et al. | 239/661 |
| 6,656,038 B1 * | 12/2003 | Persson | 460/112 |
| 2003/0109293 A1 | 6/2003 | Wolters | 460/111 |
| 2003/0114207 A1 * | 6/2003 | Wolters et al. | 460/111 |
| 2004/0029624 A1 * | 2/2004 | Weichholdt | 460/112 |
| 2004/0092298 A1 | 5/2004 | Holmen | 241/101.76 |

FOREIGN PATENT DOCUMENTS

EP    0212337    3/1987

* cited by examiner

*Primary Examiner*—Árpád Fábián Kovács
(74) *Attorney, Agent, or Firm*—Michael G. Harms; John William Stader; Stephen A. Bucchianeri (57) ABSTRACT

Adjustable deflector apparatus for transitioning crop residue from an axially arranged threshing system of a combine to a crop residue distribution system is disposed in a position such that at least a portion of a crop residue flow from the threshing system will strike or impinge the deflector and be deflected thereby downwardly and transversely toward the crop residue distribution system. An adjusting mechanism is operable for moving the deflector in relation to an internal side of the combine for adjusting a desired parameter or parameters of the deflected flow.

22 Claims, 6 Drawing Sheets

ADJUSTABLE FLOW DEFLECTOR APPARATUS FOR TRANSITIONING CROP RESIDUE FLOW FROM AN AXIALLY ARRANGED THRESHING SYSTEM TO A RESIDUE DISTRIBUTION SYSTEM OF AN AGRICULTURAL COMBINE

TECHNICAL FIELD

This invention relates generally to an apparatus for transitioning or redirecting a flow of crop residue from an axially arranged threshing or separating system of an agricultural combine so as to flow more centrally into a crop residue distribution system for distributing the residue onto a field, and more particularly, to an apparatus including a crop residue flow deflector which is adjustably positionable within a range of positions so as to be impinged to a desired extent by a flow of crop residue from an axially extending rotor and concave assembly, for transitioning or deflecting the flow to the residue distribution system for achieving desired or required operational characteristics such as a particular transverse location, pattern and/or evenness of crop residue distribution on a harvested field.

BACKGROUND ART

Axially arranged rotary threshing or separating systems have long been in use in agricultural combines for threshing crops to separate grain from crop residue, also referred to as material other than grain (MOG). Such axially arranged systems typically include at least one cylindrical rotor rotated within a concave or cage, the rotor and surrounding concave being oriented so as to extend forwardly to rearwardly within the combine.

In operation, crop material is fed or directed into a circumferential passage between the rotor and concave and is carried rearwardly therebetween by the rotation of the rotor along a generally helical path as grain is threshed from the crop material. The flow of crop residue or MOG remaining between the rotor and concave after threshing is typically discharged or expelled by the rotating rotor from a discharge opening at a rear end of the passage in a generally downward, or a downward and sidewardly direction in what is a continuation of the helical path of movement of the crop residue within the passage between the rotor and concave.

The flow is typically discharged into a passage which extends downwardly and somewhat rearwardly into a crop residue distribution system located below and rearwardly of the rear end of the threshing system, and which typically includes a rotary beater or other apparatus which propels the crop residue rearwardly within a rear end of the combine for either discharge from the combine through a rear opening onto a field, or into a chopper and/or spreader mounted on the rear end operable for spreading the residue over a swath of a field.

When spread in a swath over a field, it is desirable in many instances for the crop residue to be distributed evenly or uniformly over the swath. This is desirable for reasons including that uneven crop residue distribution on a field can lead to temperature and moisture gradients detrimental to even growth of future crops on the field. It can also make it difficult for crops to utilize nutrients, and can impact the effectiveness of agricultural chemicals. Large discontinuities of crop residue can lead to plugging and other functional problems with tillage and/or planting equipment.

One factor which has been found to influence the ability of a chopper and/or spreader to distribute crop residue evenly or uniformly over a field is the transverse or side to side evenness of crop residue inflow into the chopper and/or spreader. That is, it has been found that the amount of crop residue infeed to one side of the chopper should be about equal to infeed to the over side to achieve even distribution over a field. In turn, the side to side infeed to the chopper/spreader has been found to be a function of the side to side distribution of crop residue infeed into the beater or other impeller of the crop residue distribution system from the threshing system.

Numerous devices and structures have been developed to improve flow of crop residue from axially arranged threshing systems into crop residue distribution systems. Reference in this regard, Payne et al., U.S. Pat. No. 6,352,474 entitled Metering Edge for Axially Arranged Rotary Separator, and Pfeiffer et al., U.S. Pat. No. 6,241,605 entitled Discharge Geometry for Axially Arranged Rotary Separator.

Although the above referenced apparatus may perform well, it has been found that a variety of variables and conditions can influence the ability to redirect and transversely distribute crop residue flow in the passage between a threshing system and a crop residue distribution system.

For instance, residue from different crops, such as wheat and corn, will typically flow differently, and different rotor rotation speeds will typically be used for different crops. For instance, small grains such as wheat and other grasses will typically be threshed at a relatively high rotor speed, for instance, 600 to 1000 revolutions per minute (rpm), and produce residue containing a large volume of small stalks of straw, and, whereas corn will typically be threshed at a relatively slow rotor speed, for instance, less than 400 rpm, and produce crop residue containing a mixture of bulky stalk segments, cob fragments and large leaves. For a given crop, differences in plant maturity and weather conditions can affect size, moisture content, and other characteristics of crop residue so as to have varying flow and distribution characteristics.

As a result of the above described variables and conditions, it has been observed that the transition of crop residue flow from the threshing system to the residue distribution system can vary. In particular, the side to side distribution of the flow into the rotating beater can vary, that is, flow to one side of the beater can be heavier than to the other side, such that the beater will propel more crop residue into one side of a chopper and/or spreader, resulting, in turn, in uneven crop residue distribution over a swath of a field.

Thus, what is sought is an apparatus for transitioning crop residue from an axially arranged threshing system of a combine to a distribution system, that overcomes one or more of the problems and disadvantages set forth above.

SUMMARY OF THE INVENTION

What is disclosed is deflector apparatus for transitioning crop residue from an axially arranged threshing system of a combine to a crop residue distribution system, which overcomes one or more of the problems and disadvantages set forth above.

According to a preferred aspect of the invention, a combine includes an axially arranged threshing system having at least one rotor rotatable within a concave for discharging a flow of crop residue through a rearwardly located, generally downwardly facing discharge opening, at least a portion of the flow being directed along an internal side of the combine defining a side of a passage extending downwardly and rearwardly to a crop residue distribution system of the combine.

A deflector is disposed in the side of the passage in a position such that at least a portion of the downward crop residue flow will strike or impinge the deflector and be deflected thereby transversely by a desired amount, so as to extend in a desired manner through a more central region of the passage toward the crop residue distribution system. An adjusting mechanism is operable for moving the deflector in relation to the internal side of the combine for adjusting a desired parameter or parameters of the downwardly deflected flow, which can include, but are not limited to, a transverse location at which the flow will enter the crop residue system. As a result, heavier inflow of crop residue into a side of the crop residue distribution system closer to the internal side of the combine to which the flow is directed can be transversely redirected, so as to provide better side-to-side or transverse distribution of the crop residue flow into the crop residue distribution system. As a consequence, the crop residue distribution system will be better able to feed the crop residue more evenly into a chopper and/or spreader located on the rear end of the combine, resulting in more even and uniform distribution of the crop residue over a swath of a field from which the crop has been harvested.

As another alternative, the adjusting mechanism can be operated to move the deflector so as to direct more or less of the crop residue flow toward one of the sides of the crop residue distribution system, for feeding a corresponding greater or lesser amount of crop residue to a corresponding side of a chopper and/or spreader, for correcting or compensating for conditions such as wind drift and the like.

According to another preferred aspect of the invention, the adjusting mechanism is operable for moving the deflector in a first transverse direction for moving or shifting a location at which the flow deflected by the deflector will flow into the crop residue system in that same direction, the adjusting mechanism also being operable for moving the deflector in a second transverse direction opposite the first transverse direction, for moving the location at which the flow deflected by the deflector will flow into the crop residue distribution system in the second transverse direction.

According to another preferred aspect of the invention, the deflector includes an upper portion pivotally mounted in the combine adjacent to the internal side such that a lower portion extending downwardly from the upper portion is located in the path of at least a portion of the crop residue flow. Further, the lower portion of the deflector can include a lower edge positioned to extend into or across a path of the crop residue flow, such that a portion of the flow above the lower edge will impinge or strike the deflector and be deflected downwardly thereby into a portion of the flow below the lower edge, for deflecting the lower flow downwardly in a desired manner into the crop residue distribution system.

To facilitate such operation, the adjusting mechanism can comprise a remotely controllable actuator, such as, but not limited to, a fluid cylinder, rotary or linear actuator, dashpot, solenoid, or other well known, commercially available actuator device, which can be controllable by a switch or other operator control, or an automatic control, such as a processor based control, for achieving one or more desired crop residue flow characteristics.

According to still another preferred aspect of the invention, the deflector can have a desired shape, including, but not limited to, a generally flat shape, or a curved shape such as a concave or convex curved shape, as desired or required for a particular application. Additionally, the lower edge of the deflector can be optionally straight or have an irregular shape, such as a beveled shape, stepped shape, serrated shape, or a curved shape, such as a concave curved shape, or a convex curved shape, as desired or required.

According to another preferred aspect of the invention, a range of positions of the deflector can include a position close to the interior side of the combine so as to have little or no effect on the flow, and a range of positions extending to a desired extent into and at a desired orientation in relation to all or a portion of the crop residue flow, for achieving a desired redirecting effect on the flow.

DETAILED DESCRIPTION OF THE INVENTION

Figure 1:
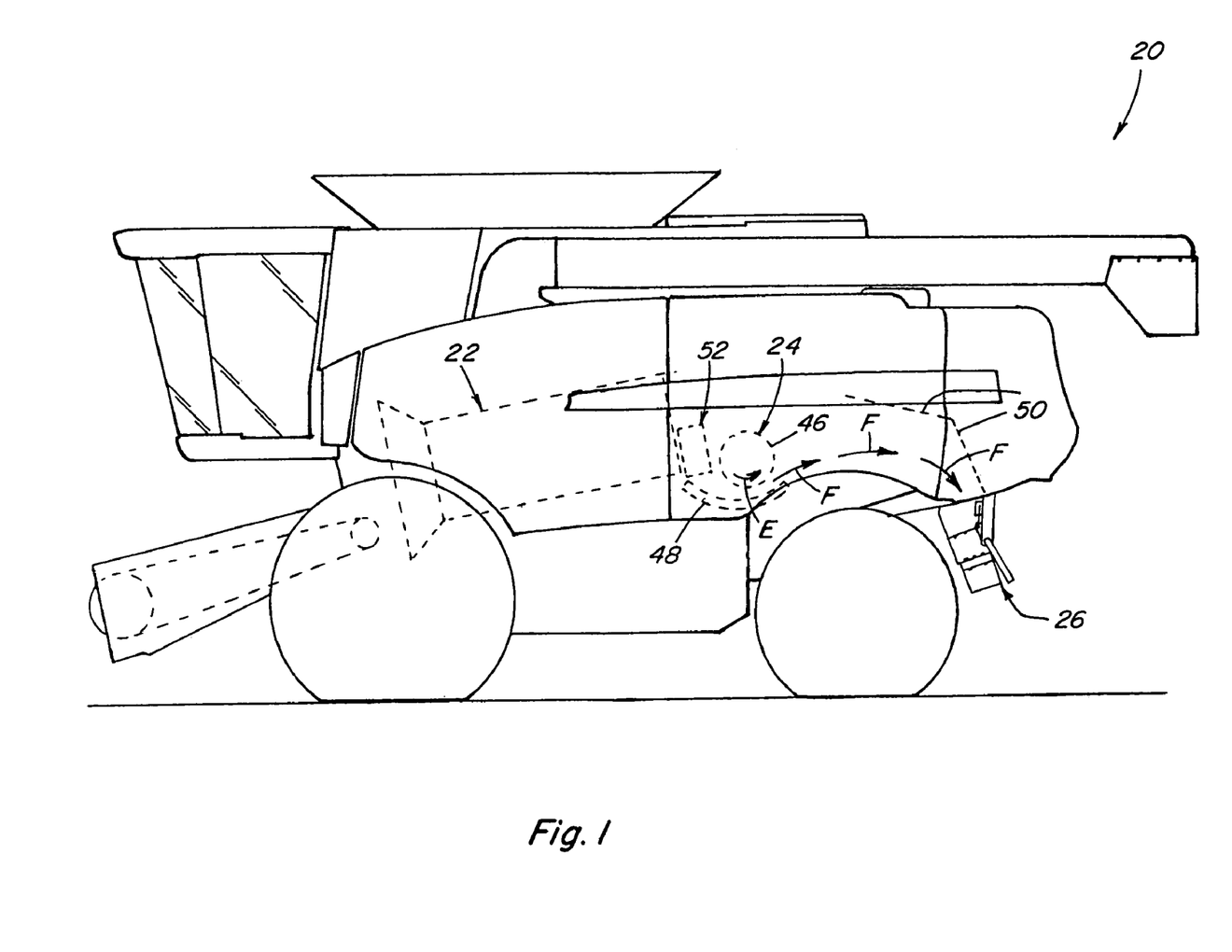
FIG. 1 is simplified schematic side view of agricultural combine, illustrating in dotted lines an axially arranged threshing system of the combine, and an adjustable deflector apparatus of the invention for transitioning crop residue flow from the threshing system to a residue distribution system of the combine.

Referring now to the drawings, wherein preferred embodiments of the present invention are shown, in FIG. 1, a representative agricultural combine 20 is shown, including an axially arranged threshing system 22; a crop residue distribution system 24; and a crop residue chopper/spreader 26, all of well known construction and operation.

Figure 2:
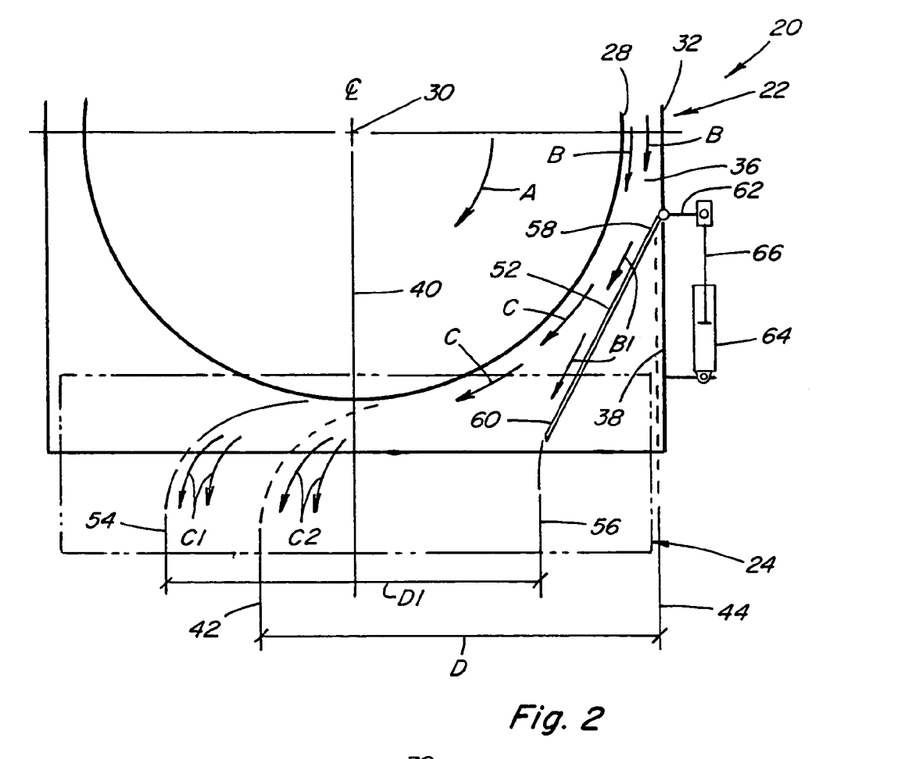
FIG. 2 is a simplified schematic rear view of the combine of FIG. 1, showing the threshing system and deflector apparatus of the invention, and illustrating in phantom a path of crop residue flow expelled from the threshing system, and an adjusted path of the flow as effected by the deflector of the invention.
Figure 3:
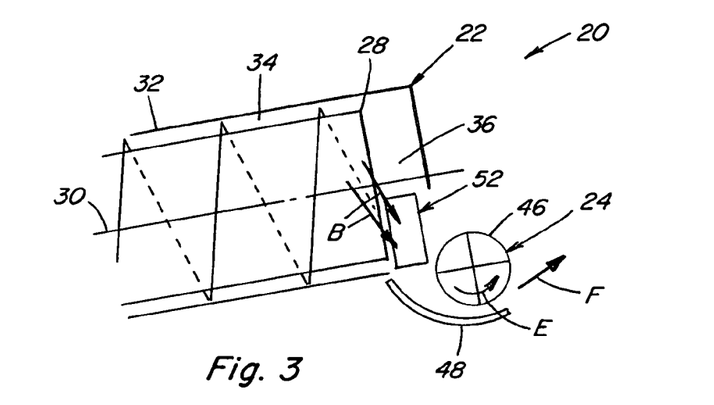
FIG. 3 is a simplified schematic side view of the threshing system, deflector of the invention, and crop residue distribution system.

Referring also to FIGS. 2 and 3, essentially, threshing system 22 is axially arranged in that it includes a cylindrical rotor 28 conventionally supported and rotatable in a predetermined direction, denoted by arrow A in FIG. 2, about a rotational axis 30 therethrough and within a concave 32, for conveying a flow of crop material in a helical flow path through a space 34 extending circumferentially around an outer cylindrical surface of rotor 28 and an inner circumferential surface of concave 32. As the crop material is moved through spacer 34, the crop, such as grain, legumes, or the like, will be loosened and separated from crop residue such as husk and pods, and carried away therefrom in the well known conventional manner.

The crop residue will continue along a helical path through space 34, and will be expelled therefrom, as denoted by arrows B, through a discharge opening 36, which essentially comprises an extension of space 34, located adjacent to the rear right side of rotor 28. Some of the flow expelled through opening 36 will tend to be directed more downwardly, as denoted by arrow B on the right hand side of FIG. 2, so as to flow generally downwardly along internal side 38, while some portions of the flow will be directed and/or be carried by rotating rotor 28 and momentum, in a transverse direction, denoted by arrows C in FIG. 2, toward an opposite internal side of combine 20, and will eventually flow downwardly toward crop residue distribution system 24, as denoted by arrows C1.

The consistency of the flow of crop residue, volume thereof, and extent or pattern thereof, will typically vary, and be a function of a variety of conditions, including, but not limited to, a speed of rotation in direction A of rotor 28, crop type, plant maturity, moisture content, and weather conditions. As an example, rotor speeds can vary between just a few hundred rpm and over a thousand rpm. Wheat and other small grains will typically have relatively small crop residue components, whereas other grains, such as crop, will typically have larger components, such as thick stalk segments, cob fragments, and large leaves. Typically, the downward flow of crop residue will be more to a right hand side of a front-to-rear extending vertical centerline 40 of both threshing system 22 and crop residue distribution system 24. The sideward extent of such typical downward flow is represented by extent D in FIG. 2, and is generally bounded on the left hand side by a line 42 extending generally downwardly on the left of centerline 40, and on the right hand side by a line 44 extending generally downwardly from internal side 38, the sideward or transverse location of line 42 and thus the transverse extent D of the downward flow varying as a function of one or more of the above conditions and/or parameters.

Here, it should be noted that crop residue distribution system 24 will typically include a rotary device, such as a beater 46 (see FIG. 3), rotatable in a direction E above a concave pan 48. Beater 46 typically rotates at a rapid speed, so as to be capable of accelerating and propelling a flow of crop residue rearwardly within the confines of the rear end of combine 20, as generally denoted by arrows F. Such rearward flow is typically guided and directed by internal panels or shields, generally denoted by shields 50 (FIG. 1), so as to either flow into a crop residue chopper and/or spreader, such as chopper/spreader 26, or through a rear opening so as to be deposited directly onto a field.

Typically, a chopper and/or spreader, such as a chopper/spreader 26 will be operated so as to distribute the crop residue in a layer on a swath of a field being harvested by combine 20. As noted above, it is often desirable for the crop residue to be distributed evenly or uniformly over the swath, for a variety of purposes, important among which is uniform emergence of subsequently planted crops, and uniform application of chemicals and fertilizers onto the field.

As also noted above, it has been found in this regard that heavier flow of crop residue into one side or the other of crop residue distribution system 24 will result in that system propelling more crop residue toward a corresponding side of a spreader apparatus, such as chopper/spreader 26, with a result of a heavier layer or distribution of crop residue on a corresponding side of a swath over a field. For the reasons set forth above, such uneven deposition of crop residue on a field is undesirable in many instances.

Figure 4:
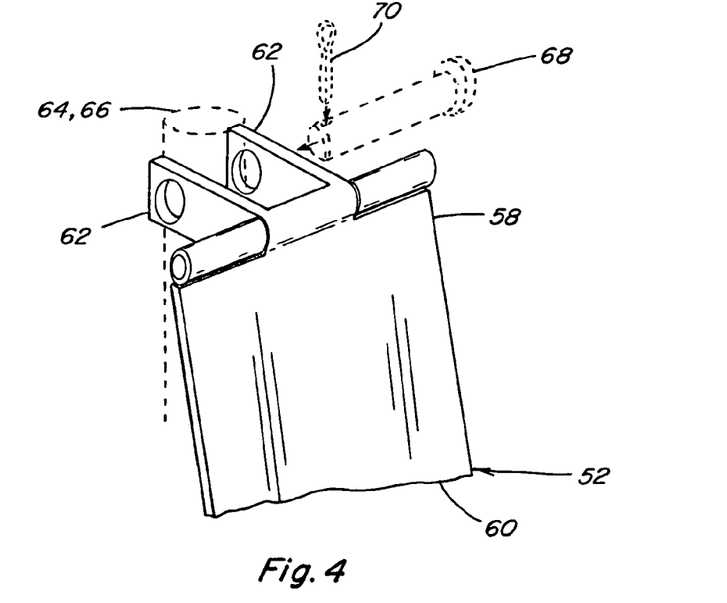
FIG. 4 is a fragmentary perspective view of one embodiment of a deflector of the invention, illustrating connection thereof with an actuator operable for adjustably moving the deflector.
Figure 5:
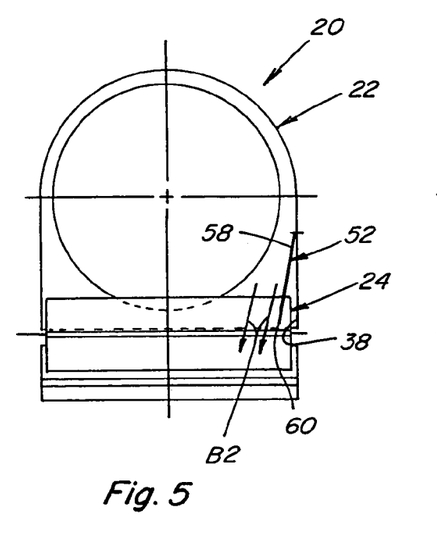
FIG. 5 is a simplified schematic rear view of the threshing system, deflector of the invention, and residue distribution system, showing the deflector in a generally upstanding position beside a side of the combine.
Figure 6:
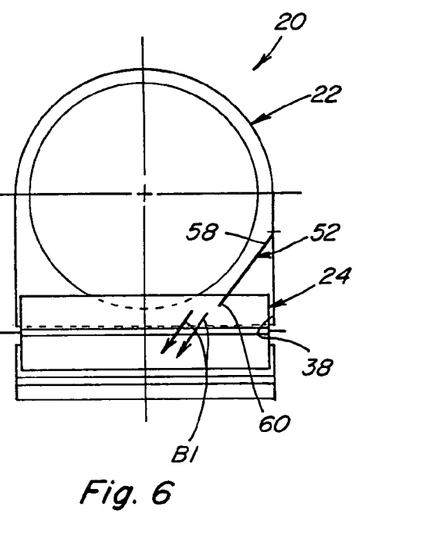
FIG. 6 is another simplified schematic rear end view of the threshing system, deflector and residue distribution system, showing the deflector at an alternative position in relation to the side of the combine.

Referring also to FIGS. 4, 5 and 6, to overcome this problem, and provide the ability to adjust the side-to-side or transverse extent and location of crop residue flow into the crop residue distribution system of a combine, such as system 24 of combine 20, the present invention resides in an adjustable deflector apparatus 52 disposed in the path of at least a portion of the crop residue flow B. More particularly, deflector apparatus 52 is preferably located in a position such that at least portions of any crop residue flow B which would flow along or close to side 38, will instead impinge or strike deflector apparatus 52 and be deflected downwardly thereby, as denoted by arrow B1 in FIGS. 2 and 6, and arrows B2 in FIG. 5.

Importantly, the downwardly directed crop residue flow, as illustrated by representative arrows B1 and B2, will be transversely shifted or moved in a transverse direction, that is, more to the left of internal side 38, depending on the transverse position and orientation of deflector apparatus 52. Here, comparing FIG. 5 to FIGS. 2 and 6, it is apparent that the farther deflector apparatus 52 is moved transversely away from side 38, the farther the downwardly directed crop residue flow is shifted in the transverse direction.

Studying FIG. 2 more particularly, it should be noted and understood that the transverse movement or shifting of downwardly directed flow B1 causes a corresponding transverse shift of other portions of the downwardly directed flow in the transverse direction, as illustrated by arrows C1. Thus, it has been found that the overall transverse extent of the downward flow of crop residue, denoted by extent D1, extending between lines 54 and 56, can be transversely moved or shifted by deployment of a deflector, such as deflector apparatus 52, in the path of portions of flow B in the vicinity of internal side 38 of the combine.

Thus, for a combine including a crop residue distribution system, such as system 24 including a rotary beater 46, the transverse position or location of crop residue inflow can be adjusted, for example, to be aligned with a vertical centerline of the distribution system, such as centerline 40, which is a joint centerline of rotor 28 of threshing system 22 and beater 46 of distribution system 24, as illustrated by the location of the center of transverse extent D1 in FIG. 2.

To enable effecting adjusting movements of deflector apparatus 52 for such purposes as effecting a transverse shift in overall crop residue flow, deflector apparatus 52 is preferably pivotally mounted to combine 20 for pivotal movement through a range of positions, such as represented by the positions shown in FIGS. 5 and 6. Deflector apparatus 52 is preferably constructed of a rigid, abrasion resistant material, such as sheet metal or the like, and includes an upper end portion 58 mounted at a suitable location, such as on internal side 38 as best shown in FIG. 2, which can comprise a portion of concave 32, or be located in the vicinity thereof.

Deflector apparatus 52 additionally includes a lower end portion 60 which extends downwardly from upper end portion 58 and is positioned in the path of at least a portion of the flow B of crop residue, so as to be impinged or struck by the flow B for deflecting it downwardly in the above-described manner. To facilitate pivotal movement of deflector apparatus 52 relative to internal side 38, upper end portion 58 preferably includes a pair of pivot arms 62 which extend through appropriate passages in internal side 38 and pivotally connect with an actuator 64 operable for effecting pivotal movement of deflector apparatus 52 through a range of positions between about those shown in FIGS. 5 and 6.

Actuator 64 is preferably located external to threshing system 22 so as to be outside of the path of the crop residue flow. Actuator 64 can be any suitable commercially available actuator device and is preferably remotely controllable, such as using a switch or other control in an operator cab of combine 20, or it can be controlled automatically such as by a processor based controller or the like (not shown), for effecting desired pivotal movements of deflector apparatus 52. Actuator 64 can comprise any suitable actuator device, such as a fluid cylinder, a linear actuator, such as a dashpot or solenoid, a rotary actuator, or the like, operable for effecting the desired movements. Here, actuator 64 is depicted as a fluid cylinder including a rod 66 having an end pivotally connected to pivot arms 62 in a suitable manner, such as using a pin 68 (FIG. 4) which can be extended through aligned holes in pivot arms 62 and rod 66, and secured therein in a suitable manner, such as using a cotter pin 70, in the well known manner.

Figure 7:
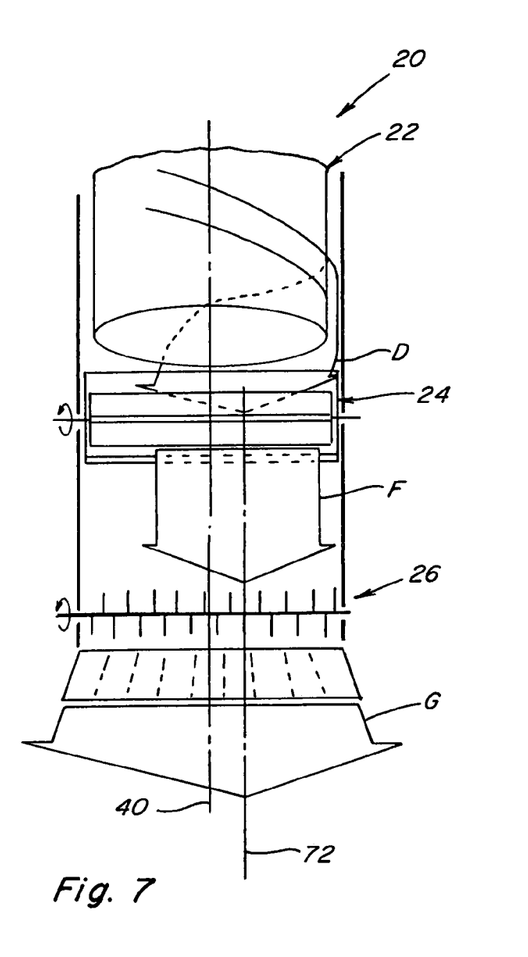
FIG. 7 is a simplified schematic top view of a rear end of the combine, showing the threshing system, crop residue distribution system, and a crop residue chopper/spreader apparatus of the combine, and illustrating crop residue flow through the rear end of the combine and a relationship of crop residue discharged from the combine in relation to an axial centerline thereof.

Referring to FIG. 7, crop residue flow characteristics from an axially arranged threshing system 22 of a combine 20, into a crop residue distribution system 24, and from there, into and from a crop residue chopper/spreader 26, are illustrated. Here, it can be observed that flow D from threshing system 22 is centered about a centerline 72 which is offset from centerline 40 of threshing system 22. As a result, crop residue flow F propelled rearwardly by crop residue distribution system 24 is similarly offset in the same direction and centered about centerline 72. Flow F flows into crop residue chopper/spreader 26 in the offset manner, and chopper/spreader 26, in turn, propels the crop residue from the rear end of combine 20 in a similarly offset manner, as illustrated by large arrow G. As a result, the crop residue will be spread unevenly over a swath of the field.

Figure 8:
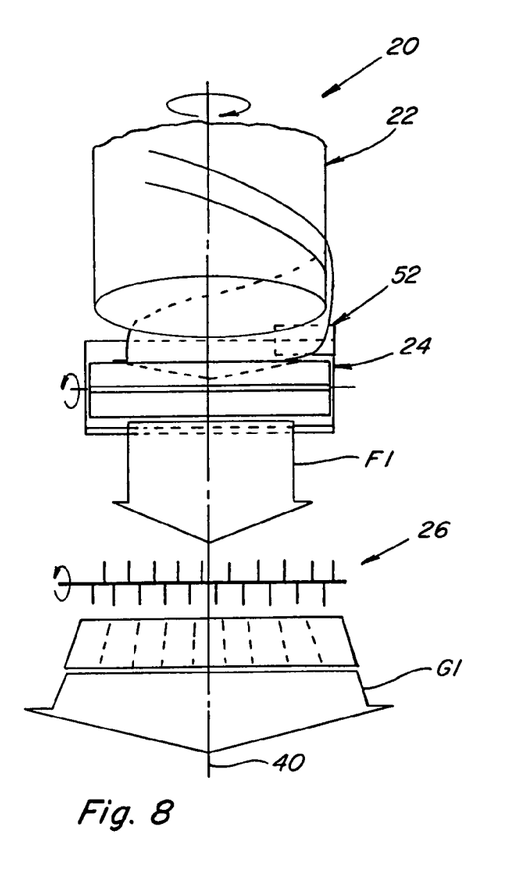
FIG. 8 is another simplified schematic top view of the combine, showing the threshing system, deflector apparatus of the invention, residue distribution system and chopper/spreader apparatus, illustrating alignment of crop residue flow with an axial centerline as the result of the present invention.

Referring also to FIG. 8, in contrast, utilizing adjustable deflector apparatus 52 of the invention in association with threshing system 22 of combine 20, for deflecting crop residue flow D1 into a crop residue distribution system 24 in a more centered manner, will result in a discharge of crop residue from distribution system 22 more centered in relation to centerline 40, as illustrated by the location of the center of arrow F1, so as to be inducted into chopper/spreader 26 in a more centered manner, and so as to be propelled from the rear end of combine 20 in more centered relation to centerline 40, as illustrated by arrow G1.

Figure 9:
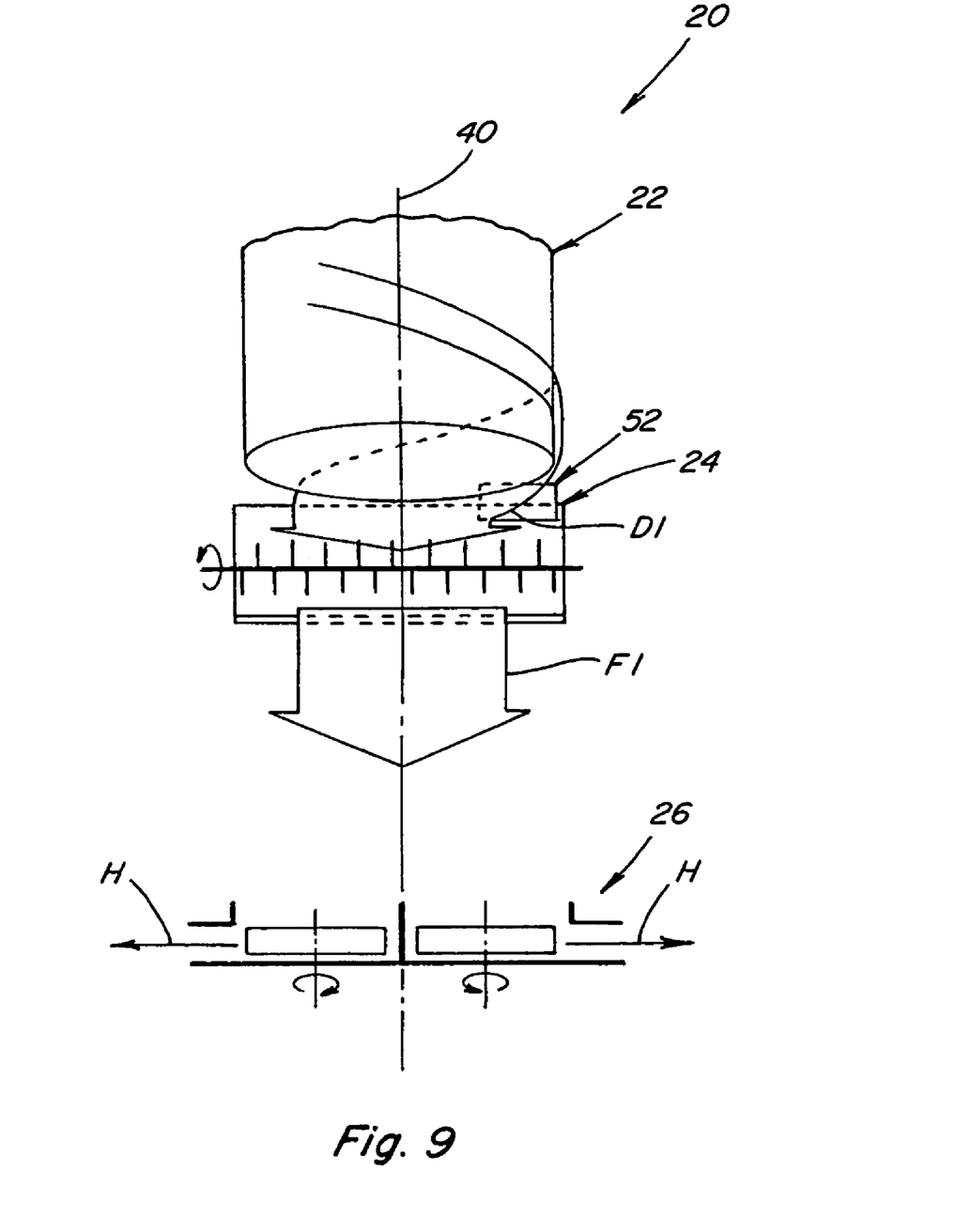
FIG. 9 is still another simplified schematic top view of the combine, showing the threshing system, deflector apparatus of the invention, and an alternative residue distribution system and spreader apparatus, illustrating alignment of crop residue flow with an axial centerline of the combine resulting from the present invention.

Referring also to FIG. 9, combine 20 is shown including axially arranged threshing system 22 and adjustable deflector apparatus 52 as explained above, but differs in that it illustrates utility of adjustable deflector apparatus 52 in association with a crop residue distribution system 24 including a rotary chopper 74 instead of beater 46. The effect is the same, the shift of the infeed of crop residue flow as effected by deflector apparatus 52 is illustrated by arrow D1, centered about centerline 40, such that discharge from distribution system 24 is also centered along centerline 40, as illustrated by arrow F1.

A different embodiment of a crop residue chopper/spreader 26 is illustrated, including a pair of impellers rotatable about horizontal axes for discharging crop residue in opposite sideward directions, as illustrated by arrows H. Again, the centered flow of crop residue F1 from distribution system 24 and into chopper/spreader 26, results in more even inflow into chopper/spreader 26, such that outflows H will be more even, resulting in more uniform spreading characteristics.

Figure 10:
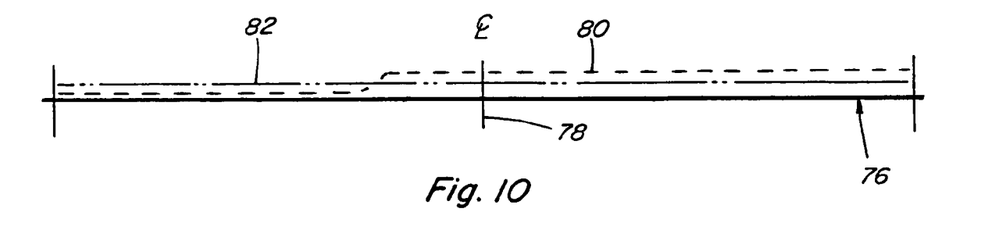
FIG. 10 is a simplified schematic representation of a swath of a field, showing in dotted lines a representative pattern of crop residue distribution over the swath without the invention, and in phantom a pattern of crop residue distribution over the swath as effected by the deflector apparatus of the invention.

Referring also to FIG. 10, a representative swath 76 of a field is shown, including a centerline 78 which will correspond in location to centerline 40 of combine 20 illustrated in the above figures. A representative distribution of crop residue without use of adjustable deflector apparatus 52 is shown by hidden line 80, and illustrates a heavier distribution of crop residue to the right hand side of centerline 78. Phantom line 82 is level and even across the extent of swath 76, and illustrates an even, uniform distribution of crop residue over a swath, such as a swath 76, utilizing the present invention, including deflector apparatus 52 in the above-described manner.

Figure 11:
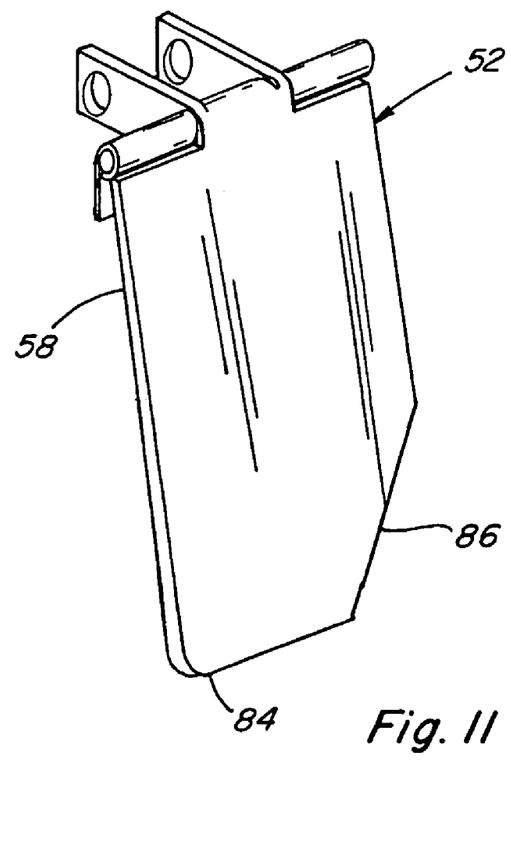
FIG. 11 is a perspective view of an alternative embodiment of a deflector according to the invention.
Figure 12:
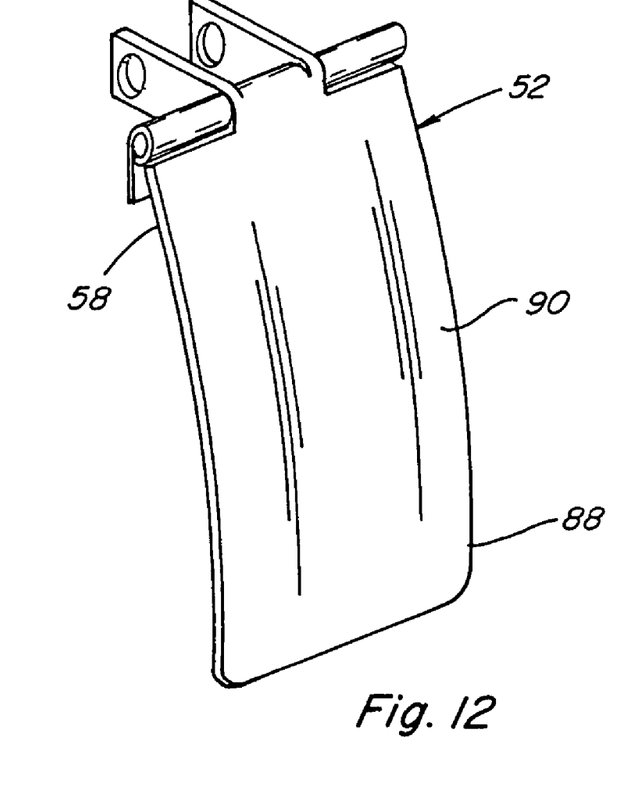
FIG. 12 is a perspective view of another alternative deflector apparatus of the invention.

FIGS. 11 and 12 illustrate alternative embodiments of adjustable deflector apparatus 52. In FIG. 11, apparatus 52 includes an alternative lower end portion 84 including a tapered lower edge portion 86. In FIG. 12, apparatus 52 is shown including a curved surface 90. These alternative embodiments illustrate the adaptability of deflector apparatus 52 for achieving a variety of crop residue flow characteristics that may be desired or required for a particular application.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. Apparatus for adjustably transitioning a flow of crop residue expelled from an axially arranged threshing system of an agricultural combine having a rotor extending along a longitudinal axis of the combine so as to flow into a crop residue distribution system of the combine, comprising:

a deflector at a location pivotally mounted adjacent to the rotor so as to be to in a path of the flow of crop residue when expelled from the rotor thereof such that at least a portion of the flow will impinge the deflector and be deflected thereby downwardly into the crop residue distribution system, the deflector rotatable about a pivot axis, the pivotal axis being substantially parallel to a longitudinal axis of the rotor; and an adjusting mechanism operable for moving the deflector within the path of the flow of the crop residue for changing a transverse location of the deflector at which the flow deflected by the deflector will flow into the crop residue distribution system.

2. The apparatus of claim 1, wherein the adjusting mechanism is operable for moving the deflector in the first transverse direction for moving the transverse location at which the flow deflected by the deflector will flow into the crop residue distribution system in a first transverse direction, and the adjusting mechanism is operable for moving the deflector in a second transverse direction for moving the transverse location at which the flow deflected by the deflector will flow into the crop residue distribution system in the second transverse direction.

3. The apparatus of claim 2, wherein the deflector includes an upper portion and a lower portion, the upper portion being pivotally mounted in the combine such that at least the lower portion is located in the path of the flow.

4. The apparatus of claim 3, wherein the lower portion of the deflector includes a tapered lower edge.

5. The apparatus of claim 2, wherein the deflector is pivotable transversely between a generally upstanding orientation and a range of orientations at acute angles to the upstanding orientation.

6. The apparatus of claim 1, wherein the adjusting mechanism comprises a remotely controllable actuator.

7. The apparatus of claim 1, wherein the rotor rotatable within a concave for expelling the flow of crop residue through a discharge opening into a passage extending downwardly into the crop residue distribution system, and the deflector is positioned in the path of the flow adjacent to a side of the passage.

8. The apparatus of claim 7, wherein the deflector has an upper portion pivotally mounted in a space between the concave and a side structure of the combine for transverse pivotal movement of a lower portion of the deflector in the path of the flow of crop residue.

9. The apparatus of claim 1, wherein the deflector has a curved shape.

10. The apparatus of claim 1, wherein the adjusting mechanism operable for moving the deflector within the path of the flow of the crop residue for approximately centering the flow of crop residue into the crop residue distribution system about an axial center line thereof.

11. Apparatus for adjustably transitioning a flow of crop residue from a discharge opening of an axially arranged threshing system of a combine so as to flow downwardly into a selectable region of a crop residue distribution system of the combine, comprising:

a deflector pivotally mounted adjacent to an internal side of the combine generally along which the flow is directed such that at least a portion of the flow will strike the deflector and be deflected thereby downwardly into the crop residue distribution system, the deflector rotatable about a pivotal axis, the pivotal axis being substantially parallel to a longitudinal axis of the combine; and an adjusting mechanism operable for moving the deflector in relation to the internal side for adjusting a transverse location at which the flow will enter the crop residue distribution system.

12. The apparatus of claim 11, wherein the adjusting mechanism is operable for moving the deflector for approximately centering the flow about an axial center of the crop residue system.

13. The apparatus of claim 11, wherein the deflector includes a lower edge having a tapered shape.

14. The apparatus of claim 11, wherein the deflector is pivotable transversely between a generally upstanding orientation and a range of orientations at acute angles to the upstanding orientation.

15. The apparatus of claim 11, wherein the adjusting mechanism comprises a remotely controllable actuator.

16. The apparatus of claim 11, wherein the deflector has an upper portion pivotally mounted adjacent to the internal side of the combine for transverse pivotal movement of a lower portion of the deflector relative to the internal side.

17. The apparatus of claim 11, wherein the deflector has a curved shape.

18. An agricultural combine comprising:

an axially arranged threshing system including a rotor extending along the longitudinal axis of the combine rotatable within a concave for discharging a flow of crop residue through a rearwardly located downwardly facing discharge opening for downward flow along an internal side defining a passage extending downwardly and rearwardly to a crop residue distribution system of the combine;

a deflector pivotally mounted adjacent to the internal side in a position such that at least a portion of the flow will strike the deflector and be deflected thereby downwardly and transversely through the passage toward the crop residue distribution system, the deflector rotatable about a pivotal axis, the pivot axis being substantially parallel to a longitudinal axis of the rotor; and an adjusting mechanism operable for moving the deflector in relation to the internal side for adjusting a transverse location at which the flow will enter the crop residue distribution system.

19. The apparatus of claim 18, wherein the adjusting mechanism is operable for moving the deflector for approximately centering the downwardly deflected flow about an axial center of the crop residue distribution system.

20. The apparatus of claim 18, wherein the deflector includes a tapered lower edge positioned to extend across the flow.

21. The apparatus of claim 18, wherein the deflector is pivotable transversely between a generally upstanding orientation and a range of orientations at acute angles to the upstanding orientation.

22. The apparatus of claim 18, wherein the adjusting mechanism comprises a remotely controllable actuator.

\* \* \* \* \*